(12) United States Patent
Jung et al.

(10) Patent No.: US 9,161,240 B2
(45) Date of Patent: Oct. 13, 2015

(54) METHOD AND APPARATUS FOR REPORTING A MEASUREMENT RESULT IN A WIRELESS COMMUNICATION SYSTEM

(75) Inventors: Sung Hoon Jung, Gyeongki-do (KR); Sung Duck Chun, Gyeongki-do (KR); Seung June Yi, Gyeongki-do (KR); Young Dae Lee, Gyeongki-do (KR); Sung Jun Park, Gyeongki-do (KR)

(73) Assignee: LG Electronics Inc., Seoul (KR)

( * ) Notice: Subject to any disclaimer, the term of this patent is extended or adjusted under 35 U.S.C. 154(b) by 170 days.

(21) Appl. No.: 13/817,579

(22) PCT Filed: Aug. 19, 2011

(86) PCT No.: PCT/KR2011/006121
§ 371 (c)(1),
(2), (4) Date: Feb. 19, 2013

(87) PCT Pub. No.: WO2012/023827
PCT Pub. Date: Feb. 23, 2012

(65) Prior Publication Data
US 2013/0148534 A1    Jun. 13, 2013

Related U.S. Application Data

(60) Provisional application No. 61/375,281, filed on Aug. 20, 2010.

(51) Int. Cl.
*H04W 24/02* (2009.01)
*H04W 24/10* (2009.01)
*H04W 28/06* (2009.01)

(52) U.S. Cl.
CPC .............. *H04W 24/02* (2013.01); *H04W 24/10* (2013.01); *H04W 28/06* (2013.01)

(58) Field of Classification Search
None
See application file for complete search history.

(56) References Cited

U.S. PATENT DOCUMENTS

| 6,748,221 | B1 * | 6/2004 | Peltola | 455/450 |
| 8,917,700 | B2 * | 12/2014 | Ji et al. | 370/331 |
| 2008/0130584 | A1 * | 6/2008 | Pani et al. | 370/332 |
| 2008/0167041 | A1 * | 7/2008 | Wang et al. | 455/436 |
| 2008/0167089 | A1 * | 7/2008 | Suzuki et al. | 455/574 |
| 2008/0170504 | A1 * | 7/2008 | Petrovic et al. | 370/235 |
| 2008/0214198 | A1 * | 9/2008 | Chen et al. | 455/450 |

(Continued)

OTHER PUBLICATIONS

3GPP TS 36.331 v9.3.0, Jun. 2010. 3rd Generation Partnership Project; Technical Specification Group Radio Access Network; Evolved Universal Terrestrial Radio Access (E-UTRA); Radio Resource Control (RRC); Protocol specification (Release 9).

(Continued)

*Primary Examiner* — Ayaz Sheikh
*Assistant Examiner* — Faiyazkhan Ghafoerkhan
(74) *Attorney, Agent, or Firm* — Morgan, Lewis & Bockius LLP

(57) ABSTRACT

The present invention relates to a method and apparatus for reporting a measurement result in a wireless communication system. A terminal configures a plurality of serving cells, and performs measurement on the plurality' of serving cells. When a measurement report is triggered, the terminal determines whether or not a quality of at least one serving cell from among the plurality of serving cells is lower than an auxiliary' threshold value. The measurement report includes the quality of a best neighboring cell at a serving frequency of the serving cell the quality of which is lower than the auxiliary threshold value.

8 Claims, 17 Drawing Sheets

(56) References Cited

U.S. PATENT DOCUMENTS

| | | | |
|---|---|---|---|
| 2008/0220784 A1* | 9/2008 | Somasundaram et al. | 455/437 |
| 2008/0268852 A1* | 10/2008 | Petrovic et al. | 455/442 |
| 2008/0268878 A1* | 10/2008 | Wang et al. | 455/458 |
| 2009/0005029 A1* | 1/2009 | Wang et al. | 455/423 |
| 2009/0245153 A1* | 10/2009 | Li et al. | 370/312 |
| 2009/0247150 A1* | 10/2009 | Fischer et al. | 455/425 |
| 2009/0274123 A1* | 11/2009 | Chang et al. | 370/332 |
| 2009/0323638 A1* | 12/2009 | Catovic et al. | 370/331 |
| 2009/0325501 A1* | 12/2009 | Somasundaram et al. | 455/67.11 |
| 2010/0020704 A1* | 1/2010 | Hu et al. | 370/252 |
| 2010/0035654 A1* | 2/2010 | Iwamura et al. | 455/561 |
| 2010/0284303 A1* | 11/2010 | Catovic et al. | 370/254 |
| 2010/0297955 A1* | 11/2010 | Marinier et al. | 455/73 |
| 2010/0322079 A1* | 12/2010 | Kitazoe et al. | 370/241 |
| 2011/0076999 A1* | 3/2011 | Kazmi et al. | 455/423 |
| 2011/0130098 A1* | 6/2011 | Madan et al. | 455/63.1 |
| 2012/0294184 A1* | 11/2012 | Jung et al. | 370/252 |
| 2013/0148534 A1* | 6/2013 | Jung et al. | 370/252 |

OTHER PUBLICATIONS

LG Electronics Inc., "S-Measure in CA," 3GPP TSG-RAN2 Meeting #70, R2-103203, May 10-14, 2010.

International Search Report issued in corresponding International Application No. PCT/KR2011/006121 dated Mar. 27, 2012.

Yuan et al., "Carrier aggregation for LTE-advanced mobile communication system," IEEE Communications Magazine, 48: 88-93 (Feb. 2010).

Sawahashi et al., "Broadband radio access: LTE and LTE-advanced," International Symposium on Intelligent Signal Processing and Communication System, 224-227 (Jan. 7-9, 2009).

Chang et al., "A Fractional Soft Handover Scheme for 3GPP LTE-Advanced System," IEEE International Conference on Communications Workshop, 1-5 (Jun. 14-18, 2009).

CATT: "Additional measurement reporting," 3GPP TSG RAN WG2 Meeting #70bis, R2-103527, 2010.

* cited by examiner

METHOD AND APPARATUS FOR REPORTING A MEASUREMENT RESULT IN A WIRELESS COMMUNICATION SYSTEM

BACKGROUND OF THE INVENTION

1. Field of the Invention

The present invention relates to wireless communication, and more specifically, to a method and apparatus that report a measurement result in a wireless communication system.

2. Related Art

3GPP ($3^{rd}$ generation Partnership Project) LTE (Long Term Evolution), which is an advanced version of UMTS (Universal Mobile Telecommunications System), is not being introduced as 3GPP release 8. 3GPP LTE uses OFDMA (orthogonal frequency division multiple access) on downlink and SC-FDMA (Single Carrier-frequency division multiple access) on uplink. 3GPP LTE adopts MIMO (Multiple Input Multiple Output) having a maximum of 4 antennas. Recently, 3GPP LTE-A (LTE-advanced) which is an advanced version of 3GPP LTE is now in discussion.

GPP LTE-A adopts technologies, such as carrier aggregation and relays. A 3GPP LTE system is a single carrier system that supports only one bandwidth (i.e., a single element carrier) of {1.4, 3, 5, 10, 15, 20} MHz bandwidths. However, LTE-A introduces a multi-carrier using carrier aggregation. The component carrier is defined with a center frequency and a bandwidth. The multi-carrier system uses a plurality of component carriers having a bandwidth smaller than the entire bandwidth.

A user equipment continues to perform measurement so as to maintain quality of a radio link with a serving cell receiving a service. A cell or a frequency, as a target for measurement, is referred to as a measurement object, and each measurement object is associated with a report configuration that independently induces a report of a measurement result. The user equipment performs measurement on the measurement targets, and if the report configuration is met, reports the measurement result to a base station.

As a multi-carrier is introduced, there may be a plurality of serving cells. If the user equipment reports measurement results for all of the plurality of serving cells to the base station, the base station may set an optimum cell to the terminal as a serving cell based on various types of information. However, radio resources in reporting the measurement result may be restricted and the measurement results of all the serving cells are not always information required for the base station.

SUMMARY OF THE INVENTION

The present invention provides a method and apparatus that report a measurement result for a plurality of serving cells.

In an aspect, a method for reporting a measurement result in a wireless communication system is provided. The method includes configuring a plurality of serving cells including at least one primary cell and at least one secondary cell, receiving a measurement configuration to report a the measurement result, performing measurement on the plurality of serving cells, determining whether a measurement report is triggered based on the measurement configuration, determining whether a quality of at least one of the plurality of serving cells is lower than a supplementary threshold when the measurement report is triggered, and transmitting the measurement report to a base station. The measurement report includes a quality of a best neighboring cell on a serving frequency of a serving cell having a quality that is lower than the supplementary threshold.

If there is a reporting cell that satisfies the measurement configuration, the measurement report may be triggered.

The measurement report further may include a quality of the reporting cell.

A serving cell whose quality is compared with the supplementary threshold may be a secondary cell.

In another aspect, an apparatus configured for reporting a measurement result in a wireless communication system is provided. The apparatus includes a radio frequency unit configured to transmit and receive a radio signal and a processor operably connected to the radio frequency unit and configured to configure a plurality of serving cells including at least one primary cell and at least one secondary cell, receive a measurement configuration to report a the measurement result, perform measurement on the plurality of serving cells, determine whether a measurement report is triggered based on the measurement configuration, determine whether a quality of at least one of the plurality of serving cells is lower than a supplementary threshold when the measurement report is triggered, and transmit the measurement report to a base station. The measurement report includes a quality of a best neighboring cell on a serving frequency of a serving cell having a quality that is lower than the supplementary threshold.

A user equipment to which a plurality of serving cells are configured sends quality information of a neighboring cell on a corresponding serving frequency to a base station only when it is useful. Accordingly, the size of a message used for a measurement result may be reduced, and unnecessary information may be prevented from being provided to the base station.

DESCRIPTION OF EXEMPLARY EMBODIMENTS

Figure 1:
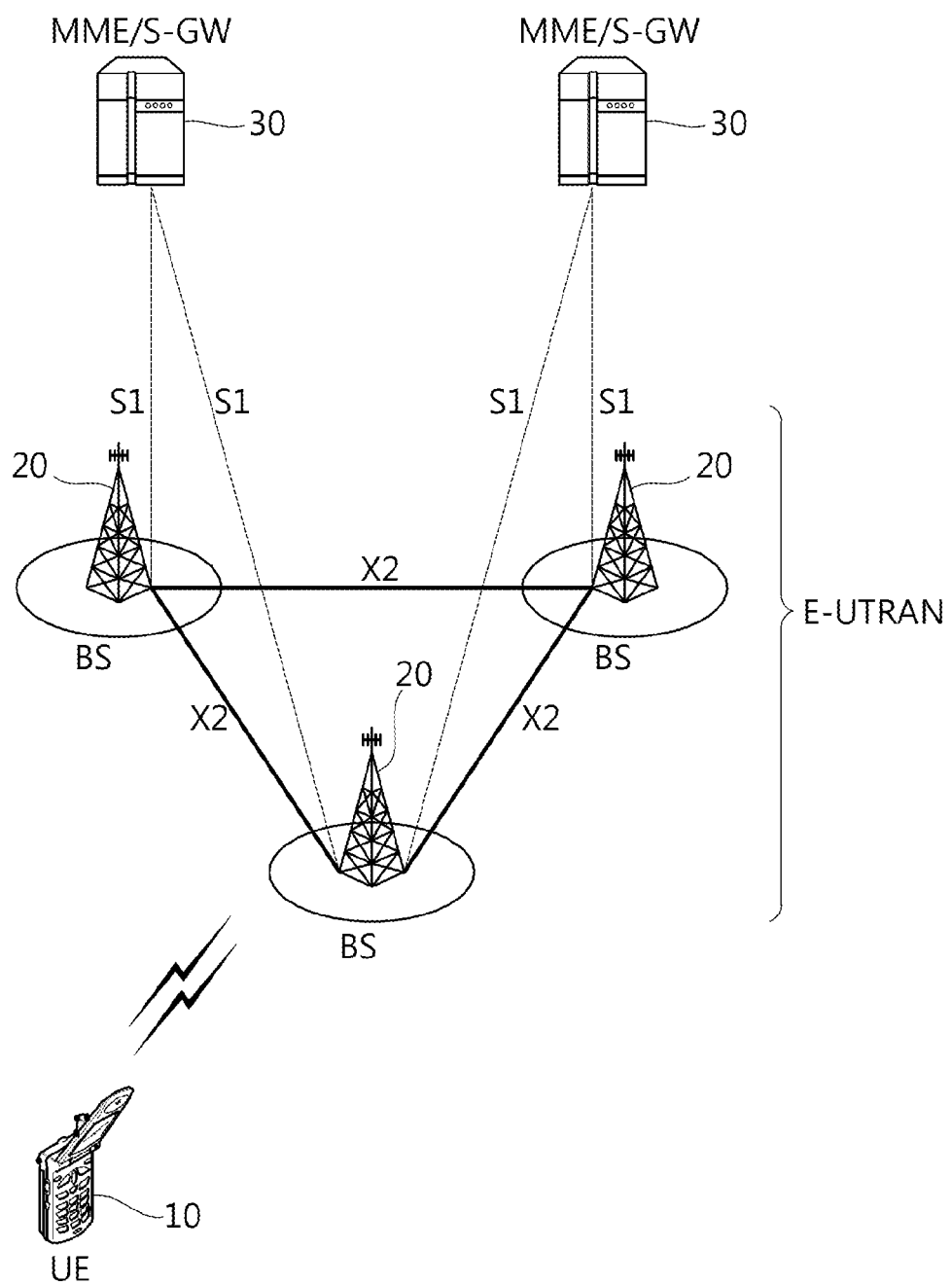
FIG. 1 illustrates a wireless communication system according to the present invention.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
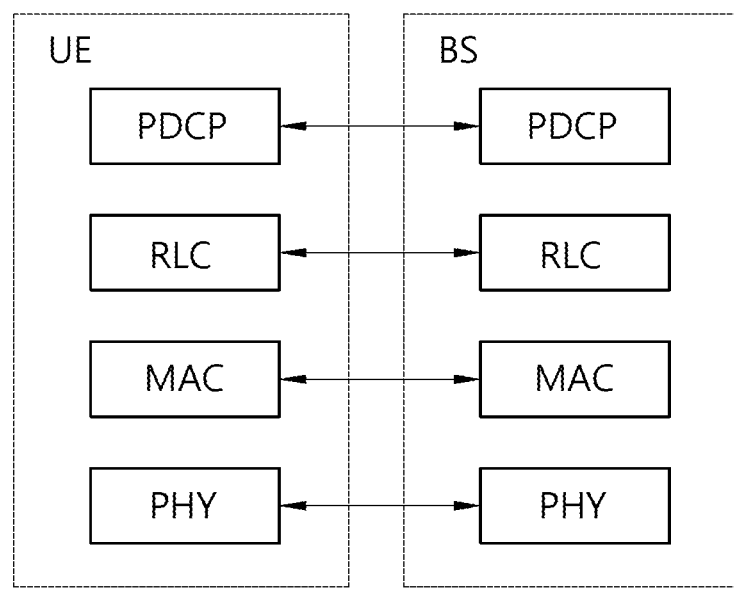
FIG. 2 is a block diagram illustrating a radio protocol architecture for a user plane.
Figure 3:
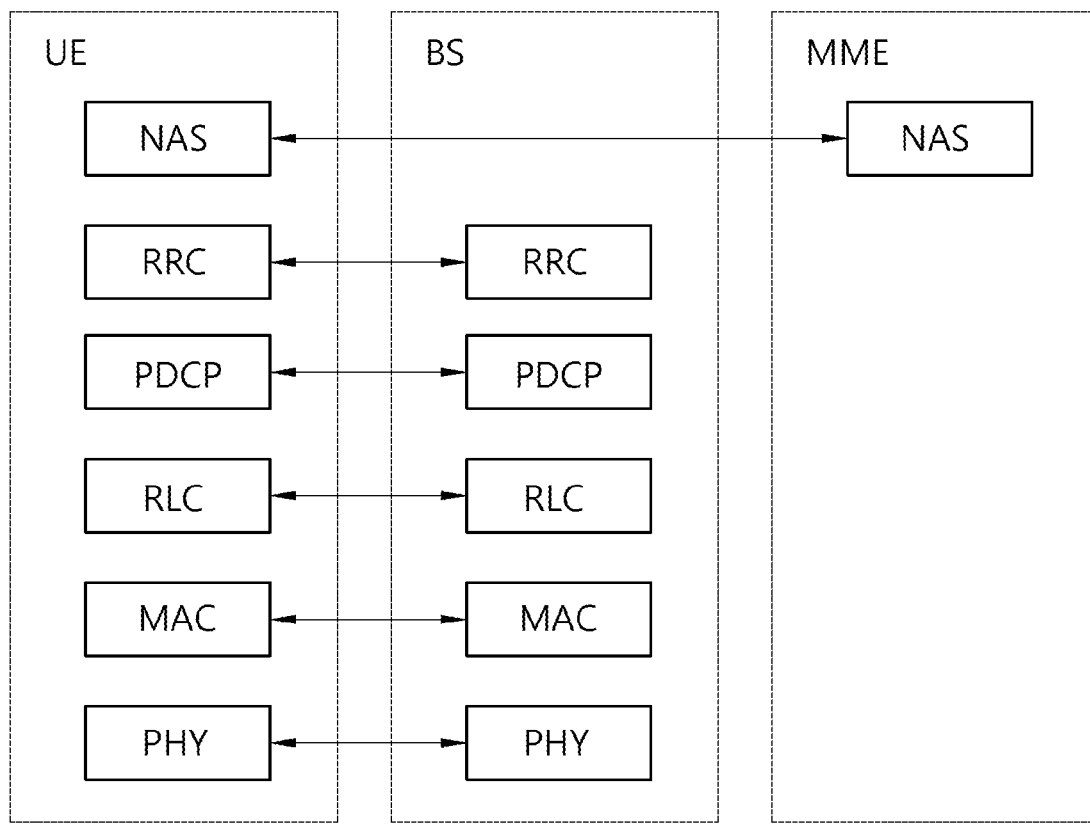
FIG. 3 is a block diagram illustrating a radio protocol architecture for a control plane.

FIG. 2 is a diagram showing a radio protocol architecture for a user plane. FIG. 3 is a diagram showing a radio protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Between different PHY layers, i.e., a PHY layer of a transmitter and a PHY layer of a receiver, data is transferred through the physical channel. The physical channel may be modulated using an orthogonal frequency division multiplexing (OFDM) scheme, and may utilize time and frequency as a radio resource.

Functions of the MAC layer include mapping between a logical channel and a transport channel and multiplexing/demultiplexing on a transport block provided to a physical channel over a transport channel of a MAC service data unit (SDU) belonging to the logical channel. The MAC layer provides a service to a radio link control (RLC) layer through the logical channel.

Functions of the RLC layer include RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

Functions of a packet data convergence protocol (PDCP) layer in the user plane include user data delivery, header compression, and ciphering. Functions of a PDCP layer in the control plane include control-plane data delivery and ciphering/integrity protection.

A radio resource control (RRC) layer is defined only in the control plane. The RRC layer serves to control the logical channel, the transport channel, and the physical channel in association with configuration, reconfiguration and release of radio bearers (RBs). An RB is a logical path provided by the first layer (i.e., the PHY layer) and the second layer (i.e., the MAC layer, the RLC layer, and the PDCP layer) for data delivery between the UE and the network.

The setup of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the network, the UE is in an RRC connected state (also may be referred as an RRC connected mode), and otherwise the UE is in an RRC idle state (also may be referred as an RRC idle mode).

Data is transmitted from the network to the UE through a downlink transport channel. Examples of the downlink transport channel include a broadcast channel (BCH) for transmitting system information and a downlink-shared channel (SCH) for transmitting user traffic or control messages. The user traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several subcarriers in a frequency domain. One subframe includes a plurality of OFDM symbols in the time domain. A resource block is a resource allocation unit, and includes a plurality of OFDM symbols and a plurality of subcarriers. Further, each subframe may use particular subcarriers of particular OFDM symbols (e.g., a first OFDM symbol) of a corresponding subframe for a physical downlink control channel (PDCCH), i.e., an L1/L2 control channel. A transmission time interval (TTI) is a unit time of subframe transmission.

Hereinafter, an RRC state of a UE and an RRC connection mechanism will be described.

The RRC state indicates whether an RRC layer of the UE is logically connected to an RRC layer of an E-UTRAN. If the two layers are connected to each other, it is called an RRC connected state, and if the two layers are not connected to each other, it is called an RRC idle state. When in the RRC connected state, the UE has an RRC connection and thus the E-UTRAN can recognize a presence of the UE in a cell unit. Accordingly, the UE can be effectively controlled. On the other hand, when in the RRC idle state, the UE cannot be recognized by the E-UTRAN, and is managed by a core network in a tracking area unit which is a unit of a wider area than a cell. That is, regarding the UE in the RRC idle state, only a presence or absence of the UE is recognized in a wide area unit. To get a typical mobile communication service such as voice or data, a transition to the RRC connected state is necessary.

When a user initially powers on the UE, the UE first searches for a proper cell and thereafter stays in the RRC idle state in the cell. Only when there is a need to establish an RRC connection, the UE staying in the RRC idle state establishes the RRC connection with the E-UTRAN through an RRC connection procedure and then transitions to the RRC connected state. Examples of a case where the UE in the RRC idle state needs to establish the RRC connection are various, such as a case where uplink data transmission is necessary due to telephony attempt of the user or the like or a case where a response message is transmitted in response to a paging message received from the E-UTRAN.

A non-access stratum (NAS) layer belongs to an upper layer of the RRC layer and serves to perform session management, mobility management, or the like.

To manage mobility of the UE in the NAS layer, two states are defined, i.e., an EPS mobility management-REGISTERED (EMM-REGISTERED) state and an EMM-DEREGISTERED state. These two states apply to the UE and the MME. Initially, the UE is in the EMM-DEREGISTERED state. To access a network, the UE performs a process of registering to the network through an initial attach procedure. If the attach procedure is successfully performed, the UE and the MME enter the EMM-REGISTERED state.

To manage a signaling connection between the UE and the EPC, two states are defined, i.e., an EPS connection management (ECM)-IDLE state and an ECM-CONNECTED state. These two states apply to the UE and the MME. When the UE in the ECM-IDLE state establishes an RRC connection with the E-UTRAN, the UE enters the ECM-CONNECTED state. When the MME in the ECM-IDLE state establishes an S1 connection with the E-UTRAN, the MME enters the ECM-CONNECTED state. When the UE is in the ECM-IDLE state, the E-UTRAN does not have context information of the UE. Therefore, the UE in the ECM-IDLE state performs a UE-based mobility related procedure such as cell selection or reselection without having to receive a command of the network. On the other hand, when the UE is in the ECM-CONNECTED state, mobility of the UE is managed by the command of the network. If a location of the UE in the ECM-IDLE state becomes different from a location known to the network, the UE reports the location of the UE to the network through a tracking area update procedure.

Next, system information will be described.

The system information includes essential information that must be known to a UE to access a BS. Thus, the UE has to receive all of the system information before accessing the BS. Further, the UE must always have the latest system information. Since the system information is information that must be known to all UEs in one cell, the BS periodically transmits the system information.

According to the section 5.2.2 of 3GPP TS 36.331 V8.4.0 (2008-12) "Radio Resource Control (RRC); Protocol specification (Release 8)", the system information is classified into a master information block (MIB), a scheduled block (SB), and a system information block (SIB). The MIB allows the UE to know a physical configuration (e.g., bandwidth) of a particular cell. The SB reports transmission information (e.g., a transmission period or the like) of SIBs. The SIB is a group of a plurality of pieces of system information related to each other. For example, an SIB includes only information of a neighbor cell, and another SIB includes only information of an uplink radio channel used by the UE.

In general, a service provided by the network to the UE can be classified into three types to be described below. Further, according to which service can be provided, the UE recognizes a cell type differently. A service type will be first described below, and then the cell type will be described.

1) Limited service: This service provides an emergency call and an earthquake and tsunami warning system (ETWS), and can be provided in an acceptable cell.

2) Normal service: This service denotes a public use service for general use, and can be provided in a suitable or normal cell.

3) Operator service: This service denotes a service for a network service provider, and a cell can be used only by the network service provider and cannot be used by a normal user.

The service type provided by a cell can be classified as follows.

1) Acceptable cell: This cell serves a UE with a limited service. This cell is not barred from the perspective of the UE, and satisfies a cell selection criterion of the UE.

2) Suitable cell: This cell serves a UE with a regular service. This cell satisfies a condition of the acceptable cell, and also satisfies additional conditions. Regarding the additional conditions, this cell has to belong to a PLMN to which the UE can access, and a tracking area update procedure of the UE must not be barred in this cell. If the corresponding cell is a CSG cell, this cell must be accessible by the UE as a CSG member.

3) Barred cell: Information indicating that a cell is a barred cell is broadcast in this cell by using the system information.

4) Reserved cell: Information indicating that a cell is a reserved cell is broadcast in this cell by using the system information.

Now, a radio link failure will be described.

A UE persistently performs measurement to maintain quality of a radio link with a serving cell from which the UE receives a service. The UE determines whether communication is impossible in a current situation due to deterioration of the quality of the radio link with the serving cell. If it is determined that the quality of the serving cell is so poor that communication is almost impossible, the UE determines the current situation as a radio link failure.

If the radio link failure is determined, the UE gives up maintaining communication with the current serving cell, selects a new cell through a cell selection (or cell reselection) procedure, and attempts RRC connection re-establishment to the new cell.

Figure 4:
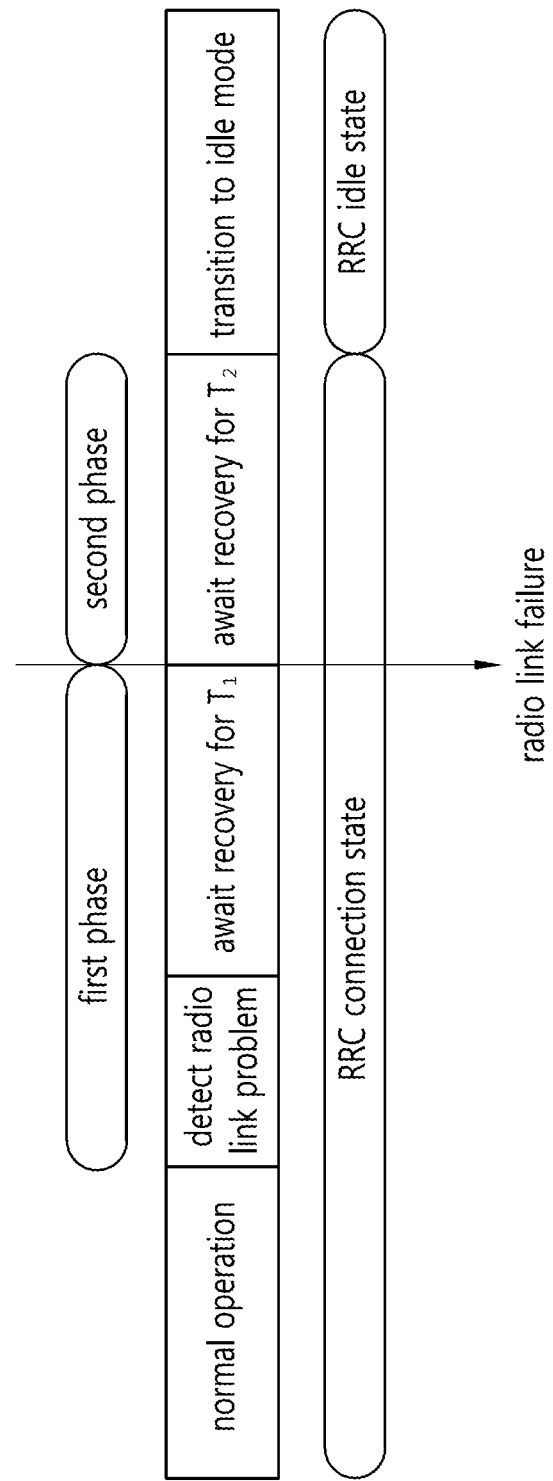
FIG. 4 is a view illustrating an example of a radio link failure.

FIG. 4 shows an example of a radio link failure. An operation related to the radio link failure can be described in two phases.

In a first phase, while performing a normal operation, a UE determines whether a current communication link has a problem. Upon detecting the problem, the UE declares a radio link problem, and waits for a recovery of the radio link during a first wait time T1. If the radio link is recovered before the expiry of the first wait time T1, the UE re-performs the normal operation. If the radio link is not recovered until the first wait time expires, the UE declares the radio link failure, and enters a second phase.

In the second phase, the UE waits again for the recovery of the radio link during a second wait time T2. If the radio link is not recovered until the second wait time expires, the UE enters an RRC idle state. Alternatively, the UE may perform an RRC re-establishment procedure.

The RRC connection re-establishment procedure is a procedure for re-establishing an RRC connection in an RRC connected state. Since the UE does not enter the RRC idle state, the UE does not initiate all connection configurations (e.g., radio bearer configuration, or the like). Instead, when the RRC connection re-establishment procedure starts, the UE temporarily suspends the use of other radio bearers except for an SRB. If the RRC connection re-establishment is successful, the UE resumes the use of radio bearers of which the use is temporarily suspended.

Figure 5:
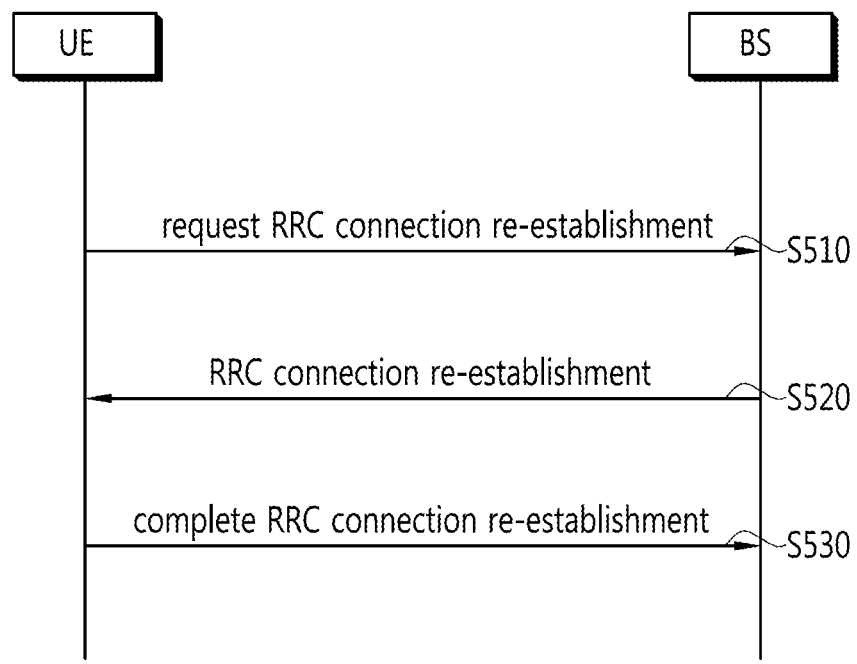
FIG. 5 is a flowchart illustrating a success of a connection reestablishment process.

FIG. 5 is a flowchart showing a success of a connection re-establishment procedure.

A UE performs cell selection to select a cell. The UE receives system information to receive basis parameters for cell access in the selected cell. Then, the UE sends an RRC connection re-establishment request message to a BS (step S510).

If the selected cell is a cell having the context of the UE, i.e., a prepared cell, the BS accepts the RRC connection re-establishment request of the UE, and transmits an RRC connection re-establishment message to the UE (step S520). The UE transmits an RRC connection re-establishment complete message to the BS, and thus the RRC connection re-establishment procedure can be successful (step S530).

Figure 6:
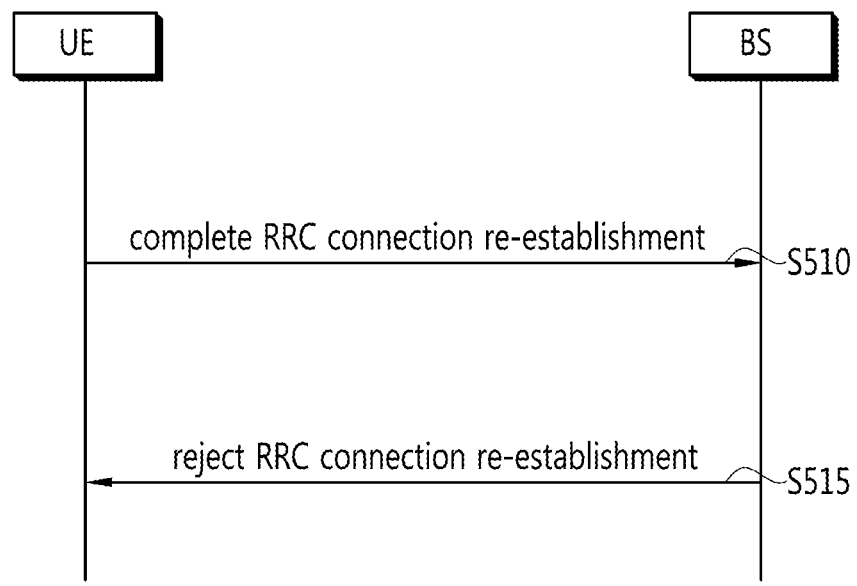
FIG. 6 is a flowchart illustrating a failure of a connection reestablishment process.

FIG. 6 is a flowchart showing a failure of a connection re-establishment procedure. A UE transmits an RRC connection re-establishment request message to a BS (step S510). If a selected cell is not a prepared cell, a BS transmits an RRC connection re-establishment reject message to a UE in response to an RRC connection re-establishment request (step S515).

Next, procedures for measurements and measurement reports will be described in detail.

It is necessary for a wireless communication system to support mobility of a UE. Therefore, the UE persistently measures quality of a serving cell providing a current service and quality of a neighbor cell. The UE reports a measurement result to a network at a proper time. The network provides optimal mobility to the UE by using a handover or the like.

To provide information which can be helpful for a network operation of a service provider in addition to the purpose of supporting the mobility, the UE may perform measurement with a specific purpose determined by the network, and may report the measurement result to the network. For example, the UE receives broadcast information of a specific cell determined by the network. The UE may report to a serving cell a cell identify (e.g., a global cell identity) of the specific cell, location identification information indicating a location of the specific cell (e.g., a tracking area code), and/or other cell information (e.g., whether it is a member of a closed subscriber group (CSG) cell).

While moving, if the UE determines that quality of a specific region is significantly poor, the UE may report a measurement result and location information on the poor cell to the network. The network may attempt to optimize the network on the basis of the measurement result reported from UEs which assist the network operation.

In a wireless communication system having a frequency reuse factor of 1, mobility is generally supported between different cells existing in the same frequency band. Therefore, in order to properly guarantee the UE mobility, the UE has to properly measure cell information and quality of neighbor cells having the same center frequency as a center frequency of a serving cell. Measurement on a cell having the same center frequency as the center frequency of the serving cell is referred to as intra-frequency measurement. The UE performs the intra-frequency measurement and reports a measurement result to the network, so as to achieve the purpose of the measurement result.

Service providers may operate networks by using a plurality of frequency bands. If a service of a communication system is provided by using the plurality of frequency bands, optimal mobility can be guaranteed to the UE when the UE is able to properly measure cell information and quality of neighbor cells having a different center frequency from the center frequency of the serving cell. Measurement on a cell having the different center frequency from the center frequency of the serving cell is referred to as inter-frequency measurement. The UE has to be able to perform the inter-frequency measurement and report a measurement result to the network.

When the UE supports measurement on a heterogeneous network, measurement on a cell of the heterogeneous network may be performed according to a configuration of a BS. Such a measurement on the heterogeneous network is referred to as inter-radio access technology (RAT) measurement. For example, RAT may include a GMS EDGE radio access network (GERAN) and a UMTS terrestrial radio access network (UTRAN) conforming to the 3GPP standard, and may also include a CDMA 200 system conforming to the 3GPP2 standard.

Figure 7:
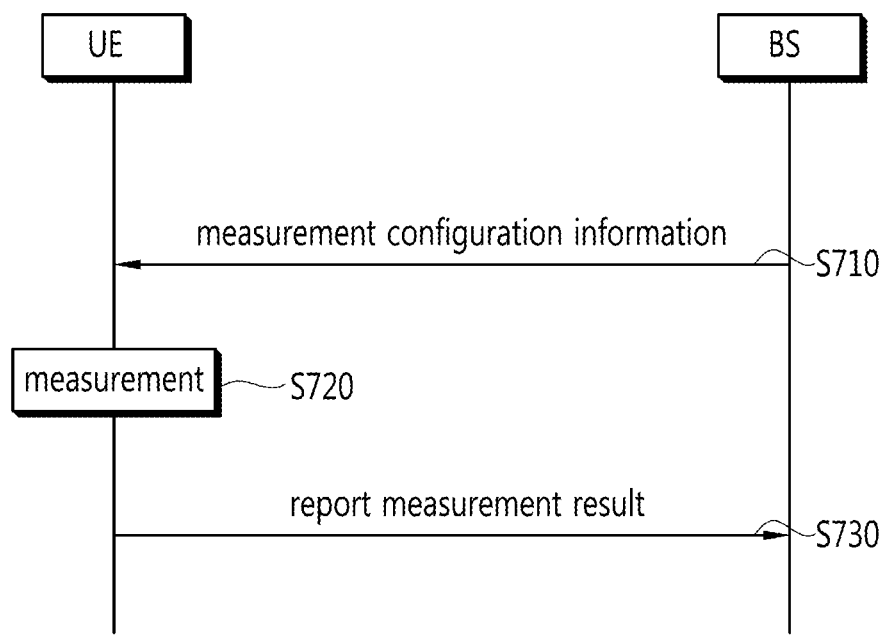
FIG. 7 is a flowchart illustrating an existing method of performing measurement.

FIG. 7 is a flowchart showing a conventional method of performing measurement.

A UE receives measurement configuration information from a BS (step S710). A message including the measurement configuration information is referred to as a measurement configuration message. The UE performs measurement based on the measurement configuration information (step S720). If a measurement result satisfies a reporting condition included in the measurement configuration information, the UE reports the measurement result to the BS (step S730). A message including the measurement result is referred to as a measurement report message.

The measurement configuration information may include the following information.

1) Measurement object: The object is on which the UE performs the measurements. The measurement object includes at least one of an intra-frequency measurement object which is an object of intra-frequency measurement, an inter-frequency measurement object which is an object of inter-frequency measurement, and an inter-RAT measurement object which is an object of inter-RAT measurement. For example, the intra-frequency measurement object may indicate a neighboring cell having the same frequency as a frequency of a serving cell, the inter-frequency measurement object may indicate a neighboring cell having a different frequency from a frequency of the serving cell, and the inter-RAT measurement object may indicate a neighboring cell of a different RAT from an RAT of the serving cell.

(2) Reporting configuration: This includes a reporting criterion and a reporting format. The reporting criterion is used to trigger the UE to send a measurement report and can either be periodical or a single event description. The reporting format is a quantity that the UE includes in the measurement report and associated information (e.g. number of cells to report).

(3) Measurement identify: Each measurement identity links one measurement object with one reporting configuration. By configuring multiple measurement identities, it is possible to link more than one measurement object to the same reporting configuration, as well as to link more than one reporting configuration to the same measurement object. The measurement identity is used as a reference number in the measurement report. The measurement identify may be included in the measurement report to indicate a specific measurement object for which the measurement result is obtained and a specific reporting condition according to which the measurement report is triggered.

(4) Quantity configuration: One quantity configuration is configured per RAT type. The quantity configuration defines the measurement quantities and associated filtering used for all event evaluation and related reporting of that measurement type. One filter can be configured per measurement quantity.

(5) Measurement gaps: Measurement gaps are periods that the UE may use to perform measurements when downlink transmission and uplink transmission are not scheduled.

To perform a measurement procedure, the UE has a measurement object, a reporting configuration, and a measurement identity.

In 3GPP LTE, the BS can assign only one measurement object to the UE with respect to one frequency. Events for triggering measurement reporting shown in the table below are defined in the section 5.5.4 of 3GPP TS 36.331 V8.7.0 (2009-09).

TABLE 1

| Event | Reporting Condition |
| --- | --- |
| Event A1 | Serving becomes better than threshold |
| Event A2 | Serving becomes worse than threshold |
| Event A3 | Neighbor becomes offset better than serving |
| Event A4 | Neighbor becomes better than threshold |
| Event A5 | Serving becomes worse than threshold1 and neighbor becomes better than threshold2 |
| Event B1 | Inter RAT neighbor becomes better than threshold |
| Event B2 | Serving becomes worse than threshold1 and inter RAT neighbor becomes better than threshold2 |

If the measurement result of the UE satisfies the determined event, the UE transmits a measurement report message to the BS.

Figure 8:
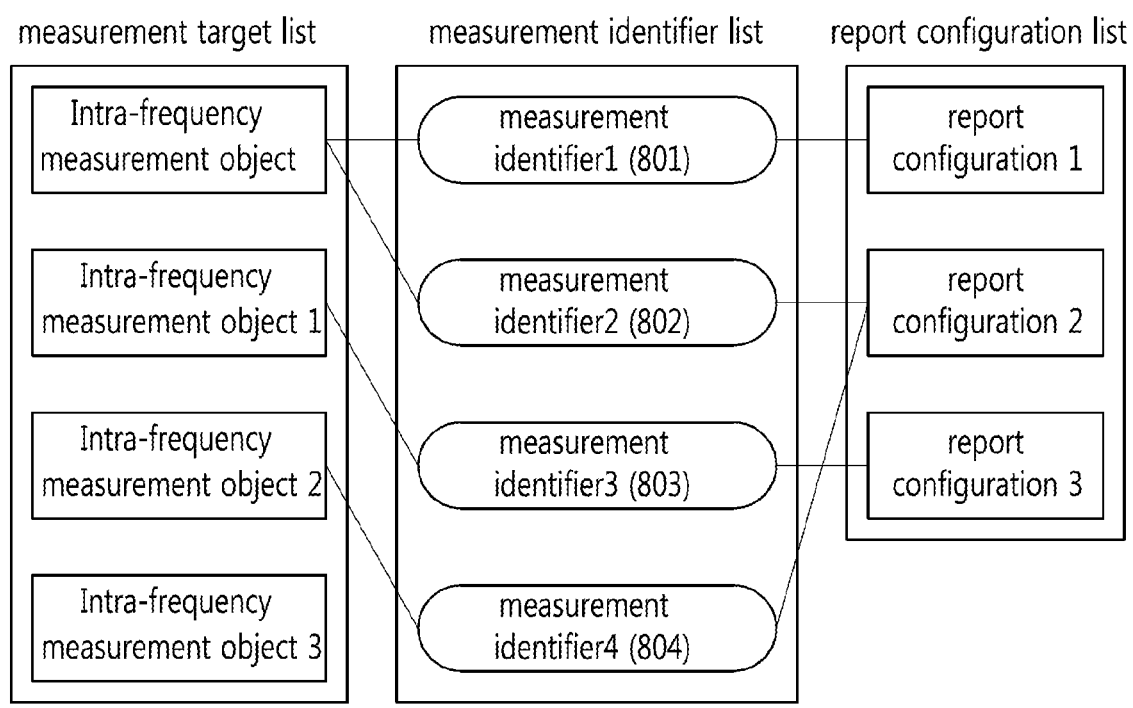
FIG. 8 illustrates an example of a measurement configuration set to a terminal.

FIG. 8 shows an example of a measurement configuration assigned to a UE.

First, a measurement identity1 801 associates an intra-frequency measurement object with a reporting configuration 1. The UE performs intra-frequency measurement. The reporting configuration 1 is used to determine a reporting type and a criterion for reporting a measurement result.

A measurement identity2 802 is associated with the intra-frequency measurement object similarly to the measurement identifier1 801, and associates the intra-frequency measurement object with a reporting configuration 2. The UE performs intra-frequency measurement. The reporting configuration 2 is used to determine a reporting format and a criterion for reporting a measurement result.

By using the measurement identity1 801 and the measurement identity2 802, the UE transmits a measurement result even if the measurement result on the intra-frequency measurement object satisfies any one of the reporting configuration 1 and the reporting configuration 2.

A measurement identity3 803 associates an inter-frequency measurement object 1 with a reporting configuration 3. When a measurement result on the inter-frequency measurement object 1 satisfies a reporting criterion included in the reporting configuration 1, the UE reports the measurement result.

A measurement identity4 804 associates an inter-frequency measurement object 2 with the reporting configuration 2. When a measurement result on the inter-frequency measurement object 2 satisfies a reporting criterion included in the reporting configuration 2, the UE reports the measurement result.

Meanwhile, the measurement object, the reporting configuration, and/or the measurement identity can be added, modified, and/or deleted. To instruct such operations, the BS may transmit to the UE a new measurement configuration message or a measurement configuration modification message.

Figure 9:
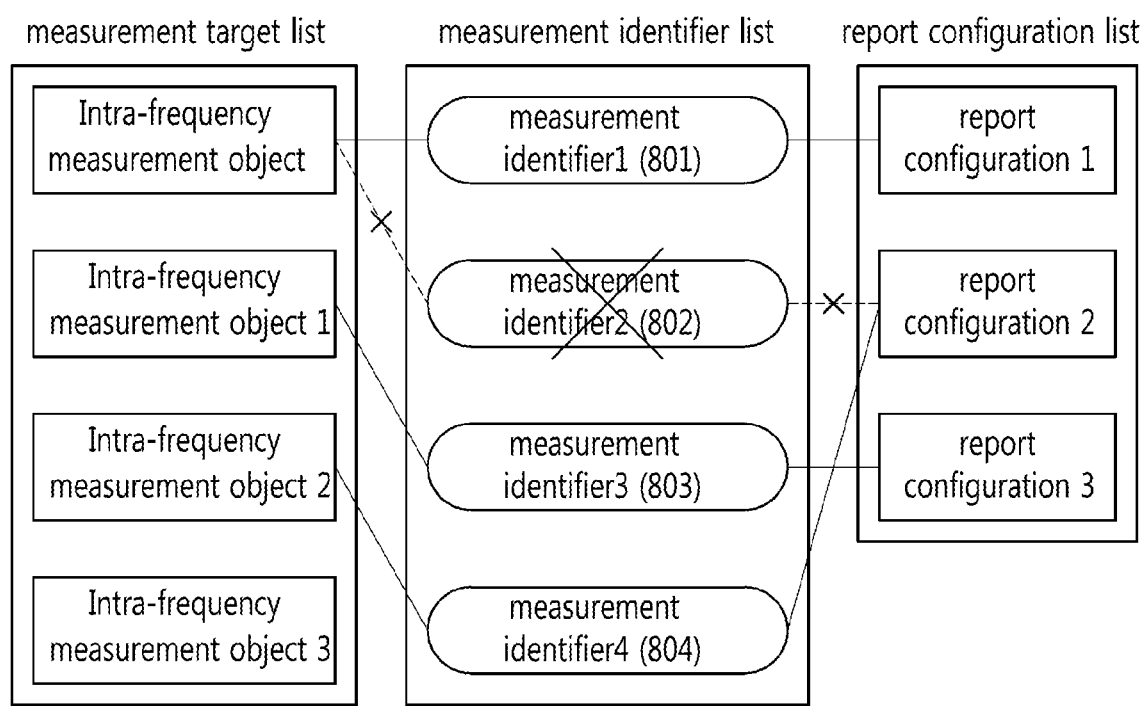
FIG. 9 illustrates an example of deleting a measurement identifier.

FIG. 9 shows an example of deleting a measurement identity. When a measurement identity2 802 is deleted, measurement on a measurement object associated with the measurement identity2 802 is suspended, and a measurement report is not transmitted. A reporting configuration or a measurement object associated with the deleted measurement identity may not be modified.

Figure 10:
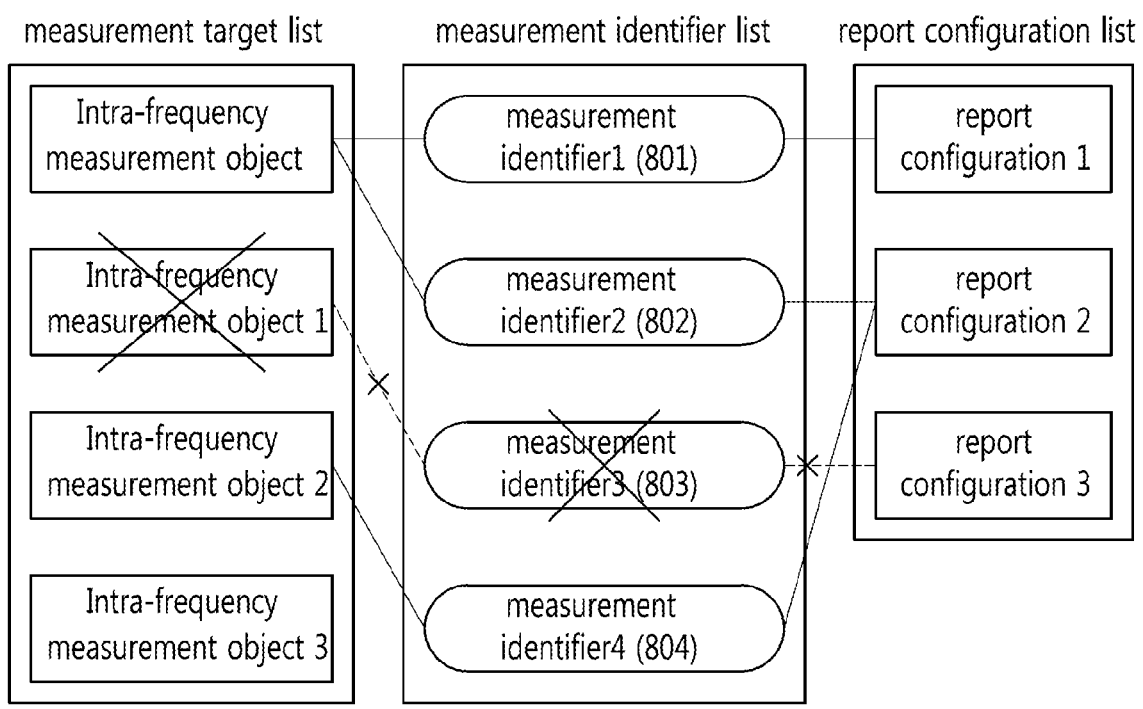
FIG. 10 illustrates an example of deleting a measurement target.

FIG. 10 shows an example of deleting a measurement object. When an inter-frequency measurement object 1 is deleted, a UE also deletes an associated measurement identifier3 803. Measurement on the inter-frequency measurement object 1 is suspended, and a measurement report is not transmitted. However, a reporting configuration associated with the deleted inter-frequency measurement object 1 may not be modified or deleted.

When the reporting configuration is deleted, the UE also deletes an associated measurement identifier. The UE suspends measurement on an associated measurement object according to the associated measurement identifier. Measurement on the measurement object and measurement reporting are suspended. However, a measurement object associated with the deleted reporting configuration may not be modified or deleted.

After receiving the measurement configuration, the UE performs measurements for the measurement object associated with the measurement identity. The UE determines whether the measurement result satisfies the reporting condition based on the reporting configuration included in the measurement configuration. If the reporting condition is satisfied, the UE sends the measurement report message which may include measurement report information.

The measurement report message may include the following information.

- a measurement identity which is associated with the reporting configuration satisfying the reporting condition. The BS can confirm that the UE transmits the measurement report by which reporting configuration is satisfied based on the measurement identity.
- a quality of the serving cell which represents the quality value of the measured serving cell.
- information of neighbor cell which includes an identity of the neighbor cell and a quality of the neighbor cell. The identity of the neighbor cell includes a physical cell identity of the neighbor cell which satisfies the reporting condition.

Now, a multiple carrier system will be disclosed.

A 3GPP LTE system supports a case where a downlink bandwidth and an uplink bandwidth are set differently under the premise that one component carrier (CC) is used. The CC is defined with a center frequency and a bandwidth. This implies that the 3GPP LTE is supported only when the downlink bandwidth and the uplink bandwidth are identical or different in a situation where one CC is defined for each of a downlink and an uplink. For example, the 3GPP LTE system supports up to 20 MHz and the uplink bandwidth and the downlink bandwidth may be different from each other, but supports only one CC in the uplink and the downlink.

Spectrum aggregation (or bandwidth aggregation, also referred to as carrier aggregation) supports a plurality of CCs. The spectrum aggregation is introduced to support an increasing throughput, to prevent a cost increase caused by using a broadband radio frequency (RF) element, and to ensure compatibility with legacy systems.

Figure 11:
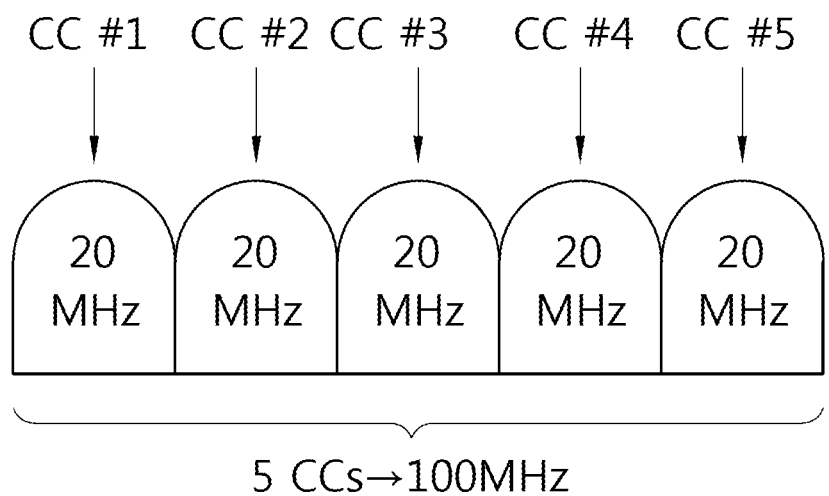
FIG. 11 illustrates an example of a multi-carrier.

FIG. 11 shows an example of multiple carriers. There are five CCs, i.e., CC #1, CC #2, CC #3, CC #4, and CC #5, each of which has a bandwidth of 20 MHz. Therefore, if the five CCs are allocated in a granularity of a CC unit having the bandwidth of 20 MHz, a bandwidth of up to 100 MHz can be supported.

The bandwidth of the CC or the number of the CCs are exemplary purposes only. Each CC may have a different bandwidth. The number of downlink CCs and the number of uplink CCs may be identical to or different from each other.

Figure 12:
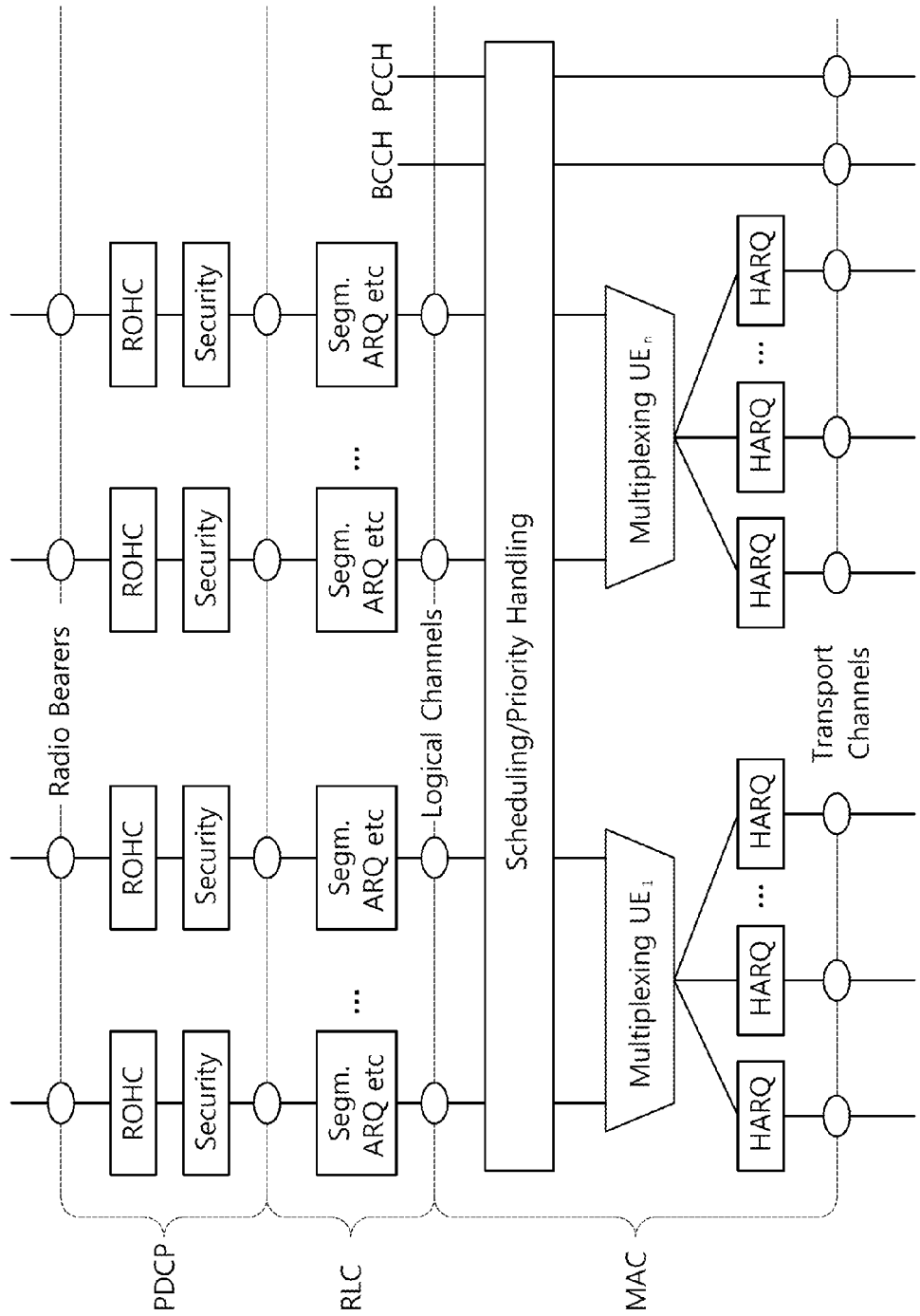
FIG. 12 illustrates a structure of a second layer of a base station for a multi-carrier.
Figure 13:
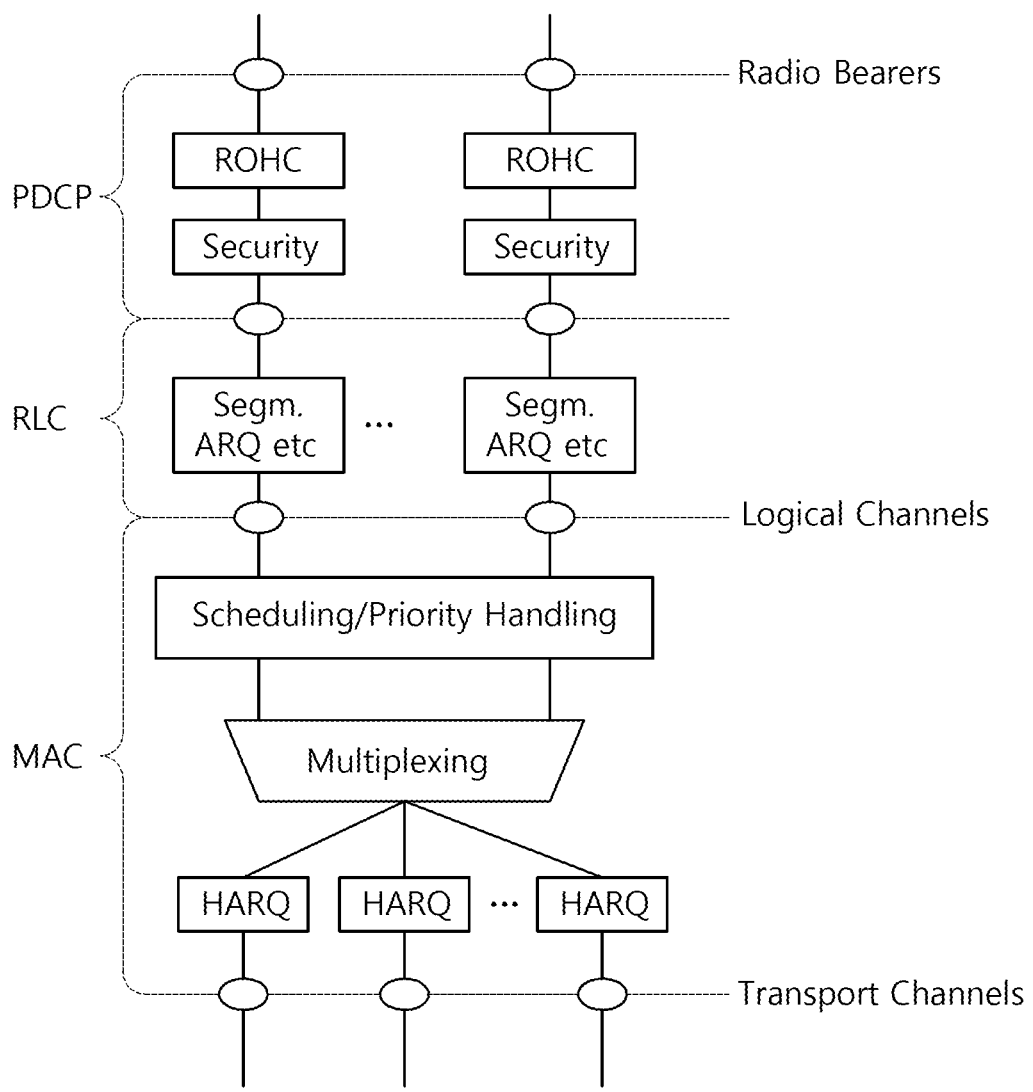
FIG. 13 illustrates a structure of a second layer of a terminal for a multi-carrier.

FIG. 12 shows a second-layer structure of a BS for multiple carriers. FIG. 13 shows a second-layer structure of a UE for multiple carriers.

A MAC layer can manage one or more CCs. One MAC layer includes one or more HARQ entities. One HARQ entity performs HARQ on one CC. Each HARQ entity independently processes a transport block on a transport channel. Therefore, a plurality of HARQ entities can transmit or receive a plurality of transport blocks through a plurality of CCs.

One CC (or a CC pair of a downlink CC and an uplink CC) may correspond to one cell. When a synchronous signal and system information are provided by using each downlink CC, it can be said that each downlink CC corresponds to one serving cell. When a plurality of downlink CCs serves the UE, it can be said that a plurality of serving cells serves the UE.

A serving cell may be classified into a primary cell and a secondary cell. The primary cell which is always activated is a cell used for network entry such as a RRC connection establishment, RRC connection re-establishment, etc. A secondary cell may be activated or inactivated by the primary cell or a specific condition. The primary cell may be configured with a pair of DL CC and UL CC. The secondary cell may be configured with a pair of DL CC and UL CC or a DL CC only. Serving cells include one or more primary cells and zero or more secondary cells.

A cell may be classified into a primary cell and a secondary cell. A serving frequency is a center frequency used by the serving cell. A primary frequency is a serving frequency used by the primary cell and a secondary frequency is a serving frequency used by the secondary cell. The primary cell is always activated. In the primary cell, the UE either performs the initial connection establishment procedure or initiates the connection re-establishment procedure. The secondary cell may be activated or inactivated by the primary cell or a specific condition. The secondary cell may be configured once an RRC connection is established and may be used to provide additional radio resources. The primary cell may be configured with a pair of DL CC and UL CC. The secondary cell may be configured with a pair of DL CC and UL CC or a DL CC only. Serving cells include one or more primary cells and zero or more secondary cells.

The suggested invention is directed towards how to perform a measurement report when a plurality of serving cells are present.

When a measurement report is triggered, the quality of cells at each serving frequency with respect to all the serving frequencies may be included in the measurement report. When the UE reports the quality of the cells at all the serving frequencies, it provides the advantage that the base station may set an optimal secondary cell to the UE by utilizing the measurement report received from the UE.

However, the quality of the cells at all the serving frequencies is not always necessary for the base station. For example, in such a situation that the quality of the secondary cell currently set to the UE is sufficiently good, it may be preferable to maintain the current configuration of the secondary cell. This means that the base station need not receive reports for the cells at all the serving frequencies.

According to the suggested invention, the UE determines whether to include the quality of a neighboring cell on each serving frequency in the measurement result according to the quality of the serving cell.

The serving cell may be a primary cell or a secondary cell.

If the quality of the serving cell on each serving frequency is a supplementary threshold or more, a measurement result of a neighboring cell at a corresponding serving frequency may not be included in the measurement report.

If the quality of the serving cell at each serving frequency is the supplementary threshold or less, a measurement result of a neighboring cell at a corresponding serving cell may be included in the measurement report.

The supplementary threshold may be a value set or predefined by a network.

The supplementary threshold may be set with respect to one or more serving frequencies.

Figure 14:
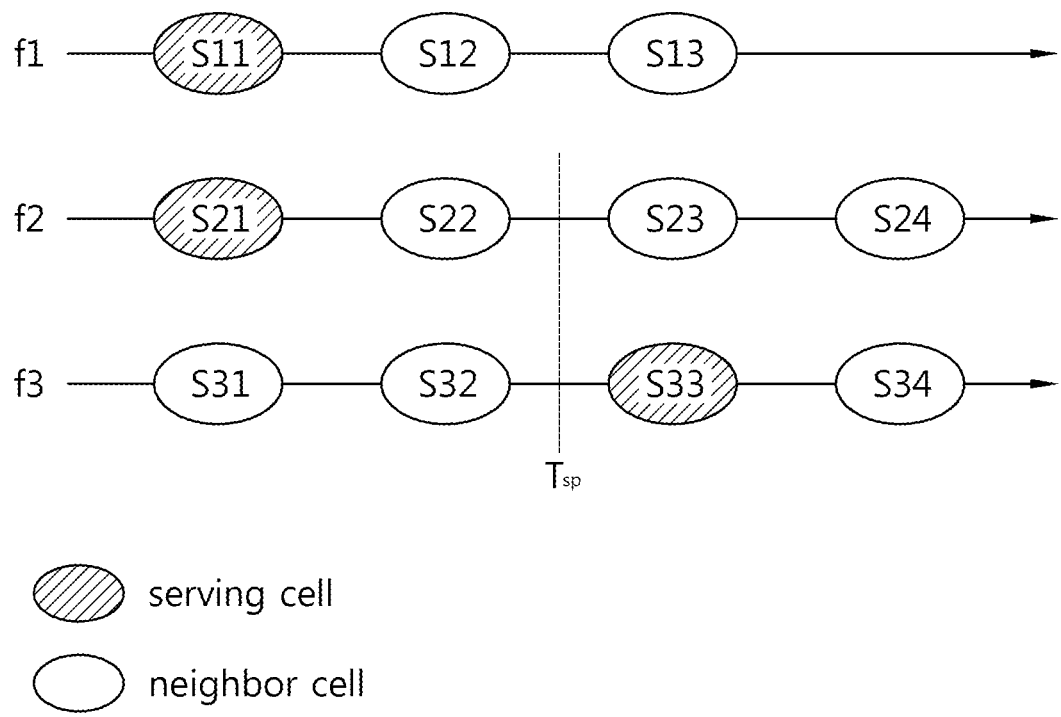
FIG. 14 is a concept view illustrating a method of reporting a measurement result according to an embodiment of the present invention.

FIG. 14 is a concept view illustrating a method of reporting a measurement result according to an embodiment of the present invention.

There are one primary cell and two secondary cells, and a primary frequency f1, a first secondary frequency f2, and a second secondary frequency f3 are considered. The primary cell S11 and neighboring cells S12 and S13 are present on the first frequency f1. The first serving cell S21 and neighboring cells S22, S23, and S24 are present on the first secondary frequency f2. The second serving cell S33 and neighboring cells S31, S32, and S34 are present on the second secondary frequency f3. The numbers of the primary cell, the serving cells, and the neighboring cells are provided merely as an example.

Going to the right on each serving frequency means that the cell quality is being deteriorated. On the primary frequency f1, the quality of the primary cell S11 is the best, on the first secondary frequency f2, the quality of the first secondary cell S21 is the best, and on the second secondary frequency f3, the quality of the neighboring cell S31 is the best.

The supplementary threshold Tsp is the same for the two secondary frequencies f2 and f3.

If the reporting condition is met and thus a measurement report is triggered, the UE additionally compares the quality of the serving cell on each secondary frequency with the supplementary threshold Tsp. If the quality of the serving cell on the secondary frequency is the supplementary threshold Tsp or more, a measurement result of a neighboring cell at a corresponding secondary frequency is not included in the measurement report. If the quality of the serving cell on the secondary frequency is the supplementary threshold Tsp or less, a measurement result of a neighboring cell having the best quality (this is referred to as a best neighboring cell) among neighboring cells at the secondary serving frequency is included in the measurement report.

For example, assume that a measurement result of a primary cell corresponds to one of events in Table 1. The measurement report is triggered by the primary cell.

The quality of the serving cell S21 on the first secondary frequency f2 is larger than the supplementary threshold Tsp. However, the quality of the serving cell S33 on the second secondary frequency f3 is smaller than the supplementary threshold Tsp.

Accordingly, the measurement report includes the quality of the primary cell, the quality of the best neighboring cell on the primary frequency, the quality of the first secondary cell S21, the quality of the second secondary cell S33, and the quality of the best neighboring cell S31 on the second secondary frequency f1.

Figure 15:
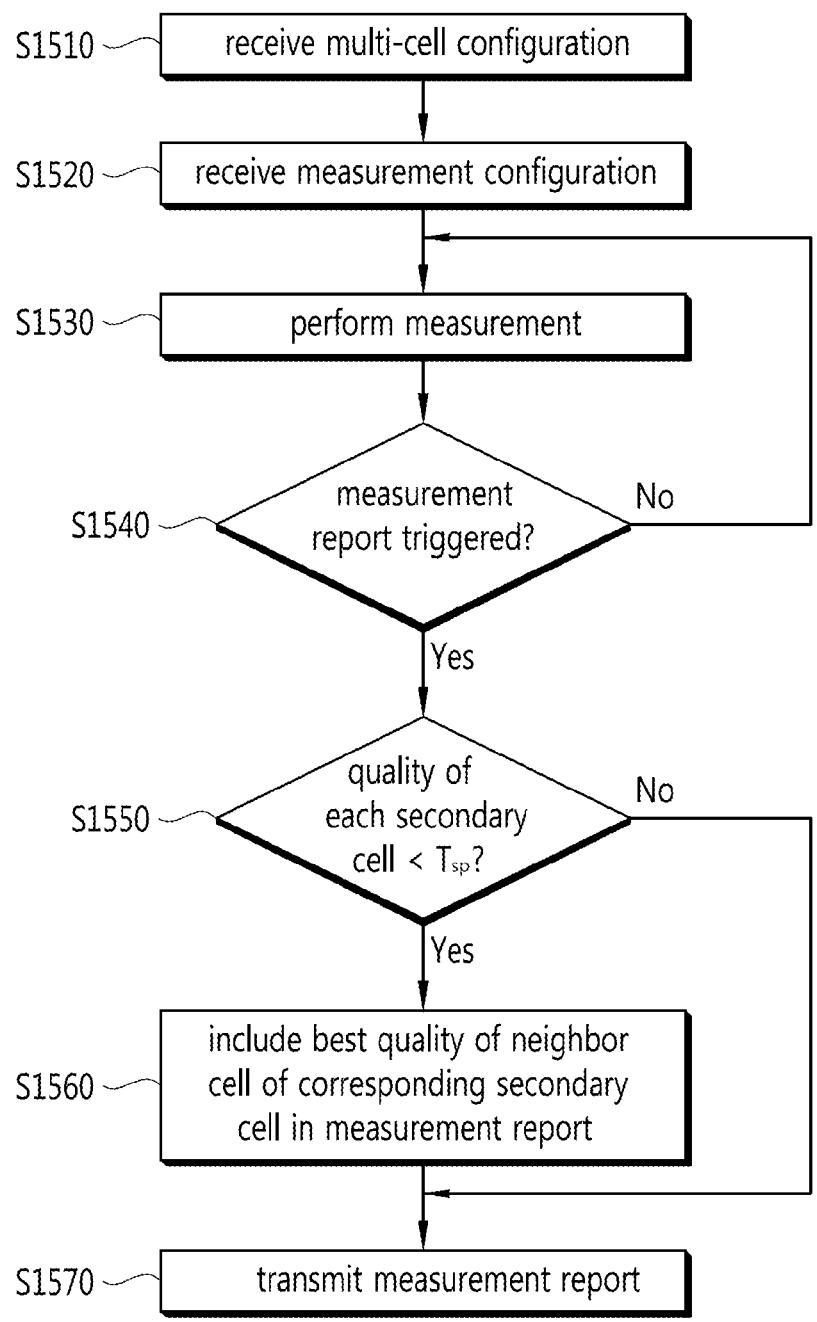
FIG. 15 is a flowchart illustrating a method of reporting a measurement result according to an embodiment of the present invention.

FIG. 15 is a flowchart illustrating a method of reporting a measurement result according to an embodiment of the present invention.

The UE receives a multi-cell configuration from the base station (S1510). The multi-cell configuration is used to set a plurality of serving cells, and at least one primary cell and at least one secondary cell are configured. Thereafter, the base station may send a message for activating or deactivating the configured secondary cell to the UE.

The UE receives the measurement configuration from the base station (S1520). The measurement configuration includes a measurement target and a report configuration.

The measurement configuration may include a supplementary threshold Tsp. The supplementary threshold may be specific to each serving cell or may be common to all the serving cells. Here, assume that the supplementary threshold is commonly given to all the secondary cells.

The measurement configuration may include an indicator indicating a determination on whether to report a best neighboring cell on each serving frequency in the measurement report. Or, the UE may determine whether to report a best neighboring cell at a corresponding serving frequency when the supplementary threshold is given to the serving cell.

The UE performs measurement (S1530). The UE measures the quality of the primary cell and the secondary cell.

The UE determines whether the measurement report is triggered (S1540). The UE determines whether there is a cell satisfying the reporting condition (this is referred to as a reporting cell) based on the measurement result. The reporting cell may include at least one of the serving cells and/or at least one of neighboring cells. If a reporting cell is found, the measurement report is triggered.

If the measurement report is triggered, the UE compares the quality of each secondary cell with the supplementary threshold Tsp (S1550).

If the quality of the secondary cell is smaller than the supplementary threshold Tsp, the measurement result of the best neighboring cell on the secondary frequency of the corresponding secondary cell is included in the measurement report (S1560). The measurement result of the best neighboring cell may include the quality of the best neighboring cell and the identifier of the best neighboring cell.

If the quality of the secondary cell is larger than the supplementary threshold Tsp, the measurement result of the best neighboring cell on the secondary frequency of the corresponding secondary cell is not included in the measurement report.

The UE transmits the measurement result of the reporting cell and the measurement result of the added best neighboring cell to the base station (S1570).

Figure 16:
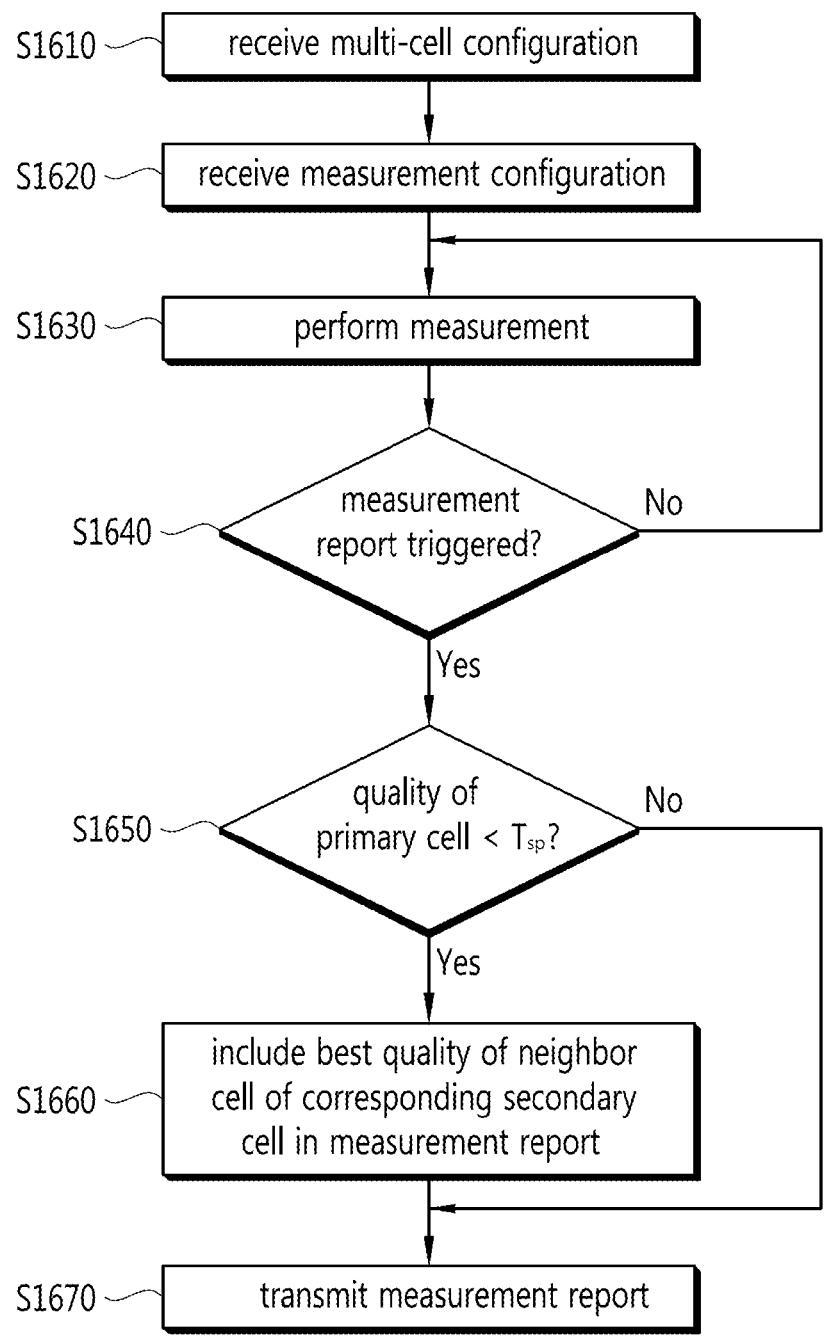
FIG. 16 is a flowchart illustrating a method of reporting a measurement result according to another embodiment of the present invention.

FIG. 16 is a flowchart illustrating a method of reporting a measurement result according to another embodiment of the present invention.

The UE receives a multi-cell configuration from the base station (S1620).

The UE receives a measurement configuration from the base station (S1620). The measurement configuration may include a supplementary threshold Tsp.

The UE performs measurement (S1630). The UE measures the quality of a primary cell and a secondary cell.

The UE determines whether a measurement report is triggered (S1640). The UE determines whether there is a reporting cell based on the measurement result. If a reporting cell is found, the measurement report is triggered.

If the measurement report is triggered, the UE compares the quality of the primary cell with the supplementary threshold Tsp (S1650).

If the quality of the primary cell is smaller than the supplementary threshold Tsp, a measurement result of a best neighboring cell on each serving frequency is included in the measurement report (S1660). The measurement result of the best neighboring cell may include the quality of the best neighboring cell and an identifier of the best neighboring cell.

The UE transmits the measurement report including the measurement result of a serving cell satisfying the reporting condition and the measurement result of the added best neighboring cell to the base station (S1670).

Figure 17:
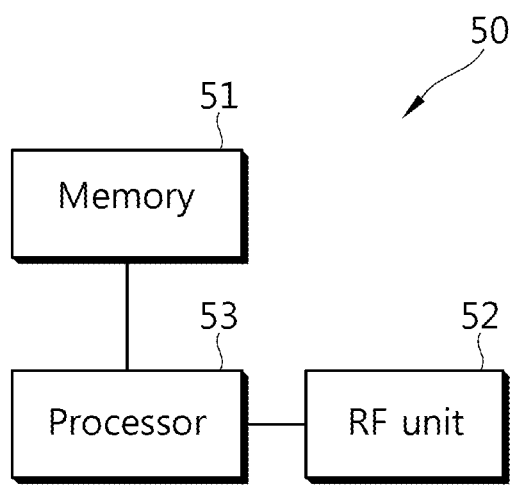
FIG. 17 is a block diagram illustrating a wireless apparatus in which an embodiment of the present invention is implemented.

FIG. 17 is a block diagram illustrating a wireless apparatus in which an embodiment of the present invention is implemented.

A UE 50 includes a processor 51, a memory 52, and an RF unit 53. The memory 52 is connected to the processor 51 and stores various pieces of information for driving the processor 51. The RF unit 53 is connected to the processor 51 and transmits and/or receives a wireless signal. The processor 51 implements the suggested functions, procedures, and/or methods. The operations of the UE in the embodiments described above in connection with FIGS. 14 to 16 may be implemented by the processor 51.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for reporting a measurement result in a wireless communication system, the method performed by a user equipment, the method comprising:

configuring a plurality of serving cells including at least one primary cell and at least one secondary cell;

receiving a measurement configuration to report a measurement result;

performing measurement on the plurality of serving cells;

determining whether a measurement report is triggered based on the measurement configuration;

determining whether a quality of at least one of the plurality of serving cells is lower than a supplementary threshold when the measurement report is triggered; and transmitting the measurement report to a base station, wherein the measurement report includes the measured quality of one or more reporting cells from the plurality of serving cells and a quality of a best neighboring cell on a serving frequency of a serving cell having a quality that is lower than the supplementary threshold, wherein the serving cell whose quality is compared with the supplementary threshold is a secondary cell that is different from a primary cell, and wherein the measurement configuration includes an indicator that indicates whether to perform the comparison between a measured quality of the secondary cell and the supplementary threshold.

2. The method of claim 1, wherein, if there is a reporting cell that satisfies the measurement configuration, the measurement report is triggered.

3. The method of claim 1, wherein the supplementary threshold is independently given for each secondary cell.

4. The method of claim 1, wherein the supplementary threshold is commonly given for all secondary cells.

5. An apparatus configured for reporting a measurement result in a wireless communication system, the apparatus comprising:

a radio frequency unit configured to transmit and receive a radio signal; and a processor operably connected to the radio frequency unit and configured to:

configure a plurality of serving cells including at least one primary cell and at least one secondary cell;

receive a measurement configuration to report a measurement result;

perform measurement on the plurality of serving cells;

determine whether a measurement report is triggered based on the measurement configuration;

determine whether a quality of at least one of the plurality of serving cells is lower than a supplementary threshold when the measurement report is triggered; and transmit the measurement report to a base station, wherein the measurement report includes the measured quality of one or more reporting cells from the plurality of serving cells and a quality of a best neighboring cell on a serving frequency of a serving cell having a quality that is lower than the supplementary threshold, wherein the serving cell whose quality is compared with the supplementary threshold is a secondary cell that is different from a primary cell, and wherein the measurement configuration includes an indicator that indicates whether to perform the comparison between a measured quality of the secondary cell and the supplementary threshold.

6. The apparatus of claim 5, wherein, if there is a reporting cell that satisfies the measurement configuration, the measurement report is triggered.

7. The apparatus of claim 5, wherein the supplementary threshold is independently given for each secondary cell.

8. The apparatus of claim 5, wherein the supplementary threshold is commonly given for all secondary cells.

* * * * *